V. C. KLOEPPER.
COMBINED SUPPORT AND GUARD.
APPLICATION FILED FEB. 28, 1920.
1,429,039.
Patented Sept. 12, 1922.
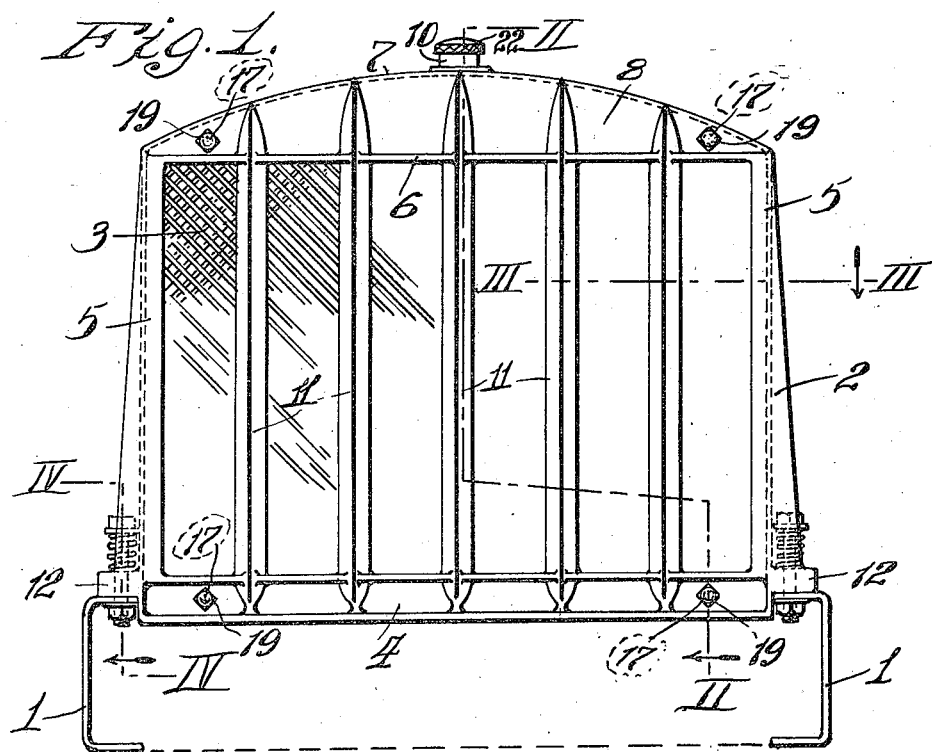
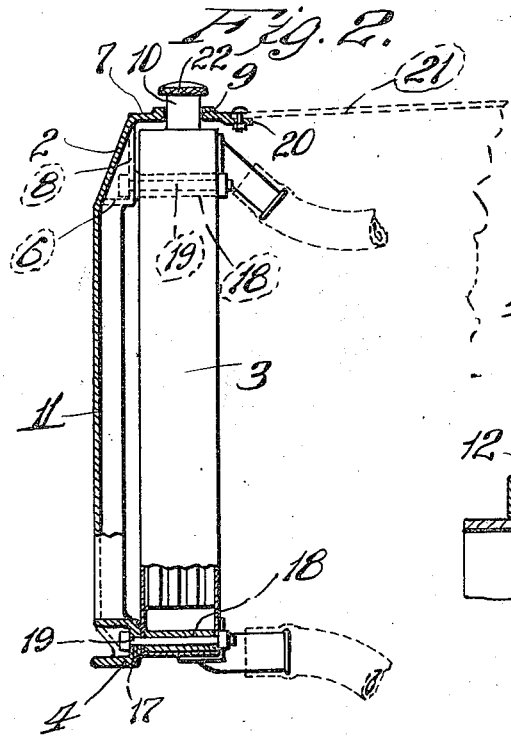
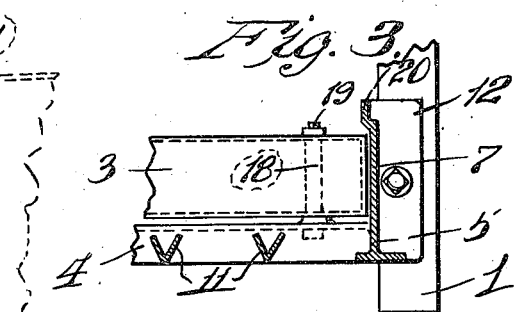
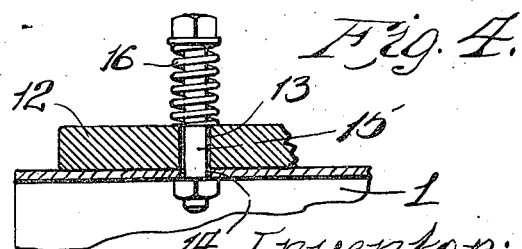

Patented Sept. 12, 1922.

1,429,039

UNITED STATES PATENT OFFICE.

VALENTINE C. KLOEPPER, OF ST. LOUIS, MISSOURI.

COMBINED SUPPORT AND GUARD.

Application filed February 28, 1920. Serial No. 362,085.

*To all whom it may concern:*

Be it known that I, VALENTINE C. KLOEPPER, a citizen of the United States of America, and a resident of the city of St. Louis and State of Missouri, have invented certain new and useful Improvements in a Combined Support and Guard for Automobile Radiators, of which the following is a specification.
The primary object of this invention is to provide an improved guard or protecting member for encasing the cooling radiator of a vehicle such as an explosive motor driven truck or tractor.
Another object of the invention is to provide an improved radiator support and guard.

A further object of the invention is in providing a guard for a vehicle radiator which not only supports the radiator but supports the front portion of the motor hood as well, and in which the radiator can be removed from the guard while the guard is still upholding the front portion of the hood.

Other and further objects will appear in the specification and be specifically pointed out in the appended claims, reference being had to the accompanying drawings exemplifying the invention, and in which, Figure 1 is a front elevation of this improved device showing it secured to the forward end of the vehicle frame.

Figure 2 is a vertical section taken approximately on the line II—II of Fig. 1 in which the greater part of the radiator is shown in full lines.

Figure 3 is a fragmentary horizontal section taken on the line III—III of Fig. 1.
Figure 4 is an enlarged vertical fragmentary section taken on the line IV—IV of Fig. 1.

Referring to the drawings 1 designates the side members of a vehicle frame, and arranged transversely of said members and mounted thereabove is a radiator guard 2 which is arranged in front of the cooling radiator 3, said guard 2 being preferably constructed in one piece, and is comprised of a lower cross member 4, vertically extending side members 5 and an overlapping upper cross member 6, having a rearwardly extending portion 7 and a downward extending portion 8, and centrally arranged in the cross member 7 is an opening 9 which is for the reception of the filling neck 10 of the radiator 3. Formed integral with the cross members 4 and 6 is a plurality of vertically extending forwardly projecting bars 11, and formed integral with the lower end of each of the side members 5 is a foot 12, said feet 12 forming a resting base for the guard 2 on the respective side members 1 of the vehicle frame, each of said feet having an opening 13, each of said openings alining with a respective bolt opening 14 provided in each of the side members 1, and passing through each pair of alining openings 13 and 14 is a bolt 15 bearing a spring 16, each of said bolts and their respective springs providing a flexible fastening member for securing the guard 2 to the side members 1 of the vehicle frame.

In the present form of construction for securing the cooling radiators to the vehicle frames, the radiators are generally secured direct to the frames, and owing to the radiators being constructed of sheet metal and the nature of such construction is delicate relative to providing a network of tubes or passages between the water heads thereof, such construction of radiators frequently get strained or sprung from the flexing movement of the side members of the vehicle frame, thereby causing them to leak.

In addition to the aforesaid, since a vehicle radiator is arranged forwardly, it is liable to receive head-on collision, which will cause damage thereto.

This improved guard while serving as a protector for the radiator against head-on collision also provides means for supporting the radiator so that the tortional strains of the vehicle frame will be received and borne by the guard. In this connection the cross members 4 and 6 of the guard are provided adjacent each end with a bolt opening 17, each bolt opening being in alinement with a bushing 18 forming part of the radiator 3, each of said bushings being for the reception of a securing bolt 19 which are passed through the respective openings 17 of the guard 2, and when the nuts of the bolts are tightened the radiator is securely held encased in the guard.

This improved guard is provided with a rearwardly extending seating portion 20 which is adapted to receive and hold a forward or front portion 21 of the motor hood, and in the event that it is desired to remove the radiator from encasement within the guard 2 after the bolts 19 and cap 22 of the radiator have been removed, the radiator can be lowered therefrom; the guard being left in its normal position and providing a support from the motor hood 21.

From the aforesaid description of this improved radiator guard and support, and since the radiator is eliminated from tortional strains of the vehicle frame, cooling radiators of this character can be provided of a simpler construction than heretofore in which the heretofore reinforcement thereof can be eliminated.

What I claim is:

1. The combination of a vehicle radiator and a guard therefor, said guard being arranged forwardly of said radiator and being provided with a plurality of integrally formed forwardly projecting portions drawing means for securing said radiator to said guard, and a horizontally extending bushing carried by said radiator for the reception of said drawing means.

2. The combination of a vehicle radiator and a guard member therefor, said member being arranged forwardly of said radiator and providing means for encasing said radiator and securing means cooperable with said radiator and said guard for demountably securing said radiator to said guard, comprised of a bushing carried by said radiator for the reception of a bolt carried by said guard.

3. In combination, a vehicle radiator provided with an opening for the reception of a horizontally extending securing member, a guard arranged forwardly thereof, a frame, and a motor hood, said guard adapted to support the forward part of said hood, a member extended from said guard into the opening of said radiator and secured therein and flexible means provided for securing said guard to said frame.

4. The combination of a radiator and a guard therefor, said radiator being provided with a plurality of horizontally extending openings, said guard having an opening formed in its upper portion for the reception of the filling neck of the radiator, and there being bolts carried by said guard each adapted to be engaged and secured in a respective opening of said radiator for supporting said radiator rearwardly from said guard.

5. The combination of a radiator, a guard for said radiator, and a frame for supporting said guard, said guard being comprised of a single supporting member which is arranged forwardly of said radiator and secured to said frame, and rearwardly extending means borne by said guard adapted to be inserted from the front of said guard for securing said radiator thereto.

V. C. KLOEPPER.